US011325073B2

(12) United States Patent
Ghaffour et al.

(10) Patent No.: US 11,325,073 B2
(45) Date of Patent: May 10, 2022

(54) FOULING RESISTANT MEMBRANE SPACERS

(71) Applicant: KING ABDULLAH UNIVERSITY OF SCIENCE AND TECHNOLOGY, Thuwal (SA)

(72) Inventors: Noreddine Ghaffour, Thuwal (SA); Adnan Qamar, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 103 days.

(21) Appl. No.: 16/090,372

(22) PCT Filed: Apr. 4, 2017

(86) PCT No.: PCT/IB2017/051926
§ 371 (c)(1),
(2) Date: Oct. 1, 2018

(87) PCT Pub. No.: WO2017/175137
PCT Pub. Date: Oct. 12, 2017

(65) Prior Publication Data
US 2019/0111399 A1    Apr. 18, 2019

Related U.S. Application Data

(60) Provisional application No. 62/318,543, filed on Apr. 5, 2016.

(51) Int. Cl.
*B01D 65/08* (2006.01)
*B01D 63/08* (2006.01)
(Continued)

(52) U.S. Cl.
CPC .......... *B01D 65/08* (2013.01); *B01D 63/082* (2013.01); *B01D 63/103* (2013.01); *C02F 1/441* (2013.01);
(Continued)

(58) Field of Classification Search
CPC .... B01D 63/082; B01D 63/103; B01D 65/08; B01D 2257/20; B01D 2257/91;
(Continued)

(56) References Cited

U.S. PATENT DOCUMENTS

2002/0162784 A1    11/2002  Kohlheb et al.
2004/0182774 A1    9/2004   Hirokawa et al.
(Continued)

FOREIGN PATENT DOCUMENTS

DE    102014100659 A1    7/2015
EP    2143480 A1         1/2010
(Continued)

OTHER PUBLICATIONS

Ranade, Vivik, Kumar, Ashwani, Fluid dynamics of spacer filled rectangular and curvilinear channels, 2005, Journal of Membrane Science 271, 1-15. (Year: 2005).*
(Continued)

*Primary Examiner* — Bradley R Spies
*Assistant Examiner* — Jeannie McDermott
(74) *Attorney, Agent, or Firm* — Patent Portfolio Builders PLLC

(57) ABSTRACT

Disclosed herein are spacers having baffle designs and perforations for efficiently and effectively separating one or more membrane layers a membrane filtration system. The spacer includes a body formed at least in part by baffles that are interconnected, and the baffles define boundaries of openings or apertures through a thickness direction of the body of the spacer. Alternatively or additionally, passages or
(Continued)

perforations may be present in the spacer layer or baffles for fluid flow there through, with the passages and baffles having a numerous different shapes and sizes.

13 Claims, 7 Drawing Sheets

(51) Int. Cl.
*C02F 1/44* (2006.01)
*B01D 63/10* (2006.01)
*C02F 101/12* (2006.01)
*C02F 103/08* (2006.01)

(52) U.S. Cl.
CPC .............. *C02F 1/442* (2013.01); *C02F 1/444* (2013.01); *B01D 2257/20* (2013.01); *B01D 2257/91* (2013.01); *B01D 2313/14* (2013.01); *B01D 2313/143* (2013.01); *B01D 2321/2016* (2013.01); *C02F 2101/12* (2013.01); *C02F 2103/08* (2013.01); *C02F 2201/002* (2013.01)

(58) Field of Classification Search
CPC ...... B01D 2313/143; B01D 2321/2016; B01D 69/00; B01D 69/10; B01D 2201/04; B01D 2201/0407; B01D 2201/0415; B01D 2201/088; B01D 2201/18; B01D 2201/32; B01D 63/10; B01D 63/12; B01D 635/02; B01D 65/022; B01D 2321/2025; B01D 2313/14; B01D 2313/19; B01D 2313/23; B01D 2315/10; C02F 1/441; C02F 1/442; C02F 1/444; C02F 2101/12; C02F 2103/08; C02F 2201/002; C02F 2201/004; C02F 2203/006

See application file for complete search history.

(56) References Cited

U.S. PATENT DOCUMENTS

| 2004/0222158 A1 | 11/2004 | Husain et al. |
| 2004/0226886 A1 | 11/2004 | Hester et al. |
| 2007/0175812 A1 | 8/2007 | Chikura et al. |
| 2008/0290031 A1 | 11/2008 | Popa et al. |
| 2014/0054004 A1 | 2/2014 | LePoudre et al. |
| 2016/0151745 A1 | 6/2016 | Karabelas et al. |

FOREIGN PATENT DOCUMENTS

| EP | 3028761 A1 | 6/2016 |
| GR | 1008635 | 12/2015 |
| JP | H07313847 A | 12/1995 |
| WO | 2004082812 A1 | 9/2004 |
| WO | 2004094048 A1 | 11/2004 |
| WO | 2004112945 A1 | 12/2004 |

OTHER PUBLICATIONS

Amber Siddiqui, et.al, Development and characterization of 3D-printed feed spacers for spiral wound membrane systems, Jan. 2016, Water Research, vol. 91,2016,pp. 55-67, ISSN 0043-1354, https://doi.org/10.1016/j.watres.2015.12.052. (Year: 2016).*
Bucs, Sz.S., et al., "Effect of Different Commercial Feed Spacers on Biofouling of Reverse Osmosis Membrane Systems: A Numerical Study", Desalination, Jun. 2014, pp. 26-37, vol. 343.
Ghaffour, N., et al., "Technical Review and Evaluation of the Economics of Water Desalination: Current and Future Challenges for Better Water Supply Sustainability", Desalination, Jan. 2013, pp. 197-207, vol. 309.
Global Water Intelligence; "Desalination Market Update"; Forecast Webinar, Jun. 14, 2018; 14 pages.
European Office Action for related European Application No. 17716310.2 dated Apr. 16, 2020. (Both of the references cited in the European Office Action are already of record.).
International Search Report in related International Application No. PCT/IB2017/051926, dated Aug. 10, 2017.
Written Opinion of the International Searching Authority in related International Application No. PCT/IB2017/051926, dated Aug. 10, 2017.
Communication pursuant to Article 94(3) EPC in corresponding/related European Application No. 17716310.2, dated Sep. 7, 2020 (Documents D1 and D2 were cited in the IDS filed Oct. 1, 2018).

* cited by examiner

FOULING RESISTANT MEMBRANE SPACERS

RELATED APPLICATION DATA

This application is a U.S. National Stage of International Application No. PCT/IB2017/051926, filed on Apr. 4, 2017, which claims the benefit of U.S. Provisional Patent Application Ser. No. 62/318,543, filed Apr. 5, 2016, the entire contents of which are incorporated herein by reference.

TECHNICAL FIELD

The present invention relates generally to fouling resistant spacer components in a membrane filtration assembly.

BACKGROUND OF THE INVENTION

The background of this invention will address general topics involving Water Treatment and Desalination, Membrane Filtration Technology, and Membrane Fouling.

Water Treatment and Desalination

Water treatment can be any type of procedure that makes water suitable for a particular purpose. Purposes such as purifying water for drinking and irrigation, cleaning industrial-use or recreation-use waters, and safely returning water to lakes and rivers are but a few of the specific end uses of treated water. Such water treatments include removing organic and inorganic contaminants, removing biological contaminants such as microorganisms, and reducing concentration of dissolved solutes. Water desalination is one type of water treatment whereby previously unusable water is made suitable for a variety of uses.

Water desalination is a process that removes minerals from saline water, such as seawater or brackish water, to produce water that is suitable for human or agricultural uses. The minerals removed from saline water usually include dissolved salts and other minerals. Feed water sources for desalination processing usually include brackish, seawater, wells, surface (rivers and streams), wastewater, and industrial feed and process waters.

Desalination of seawater is an effective means for producing fresh water, but can be costly because of the significant amounts of energy required for the process. Most of the recent desalination research focuses on production of fresh water for human or animal consumption in more efficient manners, especially in geographic areas where seawater is abundant and fresh water or rainwater are more limited.

There are a number of methods for desalinating water, including distillation and evaporation, but the most prevalent desalination process is the use of reverse or forward osmosis membrane filtration. These osmosis membrane filtration processes use membranes that allow water to permeate through the membrane while preventing minerals and salts from passing through the membrane.

Some seawater desalination processes have the potential to reliably produce enough potable water to support large populations located near coastal areas, but the required energy consumption is a significant hindrance to the economical use of this process. Numerous membrane filtration seawater desalination plants are currently under construction or in the planning stages in California, such as the 50 million gallons per day (mgd) Carlsbad Desalination plant scheduled to be operational by 2016.

Membrane separation requires driving forces including pressure (applied and vapor), electric potential, and concentration to overcome natural osmotic pressures and effectively force water through membrane processes. The need for such driving forces makes desalination membrane technology energy intensive, and this area of technology has research focused on continually improving efficiency and reducing energy consumption of such techniques.

Reverse osmosis (RO) and nanofiltration (NF) are the leading pressure driven membrane processes. Operating pressures for RO and NF are in the range of 50 to 1,000 psig (3.4 to 68 bar, 345 to 6896 kPa). Electrodialysis (ED) and Electrodialysis Reversal (EDR) processes are driven by direct current (DC) in which ions (as opposed to water in pressure driven processes) flow through ion selective membranes to electrodes of opposite charge. These ED and EDR systems are used primarily in waters with low total dissolved solids (TDS). In EDR systems, the polarity of the electrodes is reversed periodically. Ion-transfer (perm-selective) anion and cation membranes separate the ions in the feed water.

Forward osmosis (FO) is a relatively new commercial desalination process in which a salt concentration gradient (osmotic pressure) is the driving force through a synthetic membrane. The feed (such as seawater) is on one side of the semi permeable membrane and a higher osmotic pressure "draw" solution is on the other side. Without applying any external pressure, the water from the feed solution will naturally migrate through the membrane to the draw solution. The diluted solution is then processed to separate the product from the reusable draw solution.

Membrane Distillation (MD) is a water desalination membrane process currently in limited commercial use. MD is a hybrid process of RO and distillation in which a hydrophobic synthetic membrane is used to permit the flow of water vapor through the membrane pores, but not the solution itself. The driving force for MD is the difference in vapor pressure of the liquid across the membrane.

There exists a significant need to discover or improve on these known process technologies to achieve alternative sources of desalinized water and adopt stricter water reclamation processes in safe, economical, and energy efficient ways.

Membrane Filtration Technology

A membrane is a selective barrier that has a partial permeability—it will allow certain substances to pass through the barrier, but prevent other substances from doing so. A membrane is usually defined by a discrete, thin interface that moderates the permeation of chemical species in contact with it. The substances that can pass through, or be prevented from passing through, the membrane interface may be molecules, ions or other small particles.

The influent of an artificial membrane is known as the "feed-stream," and the liquid that passes through the membrane is known as "permeate." The liquid containing the retained constituents (substances that are prevented from passing through the membrane) is the "retentate" or "concentrate." A normal filter meets this definition of a membrane, but, by convention, the term membrane is usually limited to structures that allow dissolved or colloidal species to permeate, whereas the term filter is used to designate structures that separate larger-sized particulate suspensions.

The degree of selectivity of a membrane depends on the membrane pore size. Depending on the pore size, they can be classified as microfiltration (MF), ultrafiltration (UF), nanofiltration (NF) and reverse osmosis (RO) membranes. Membranes can be neutral or charged, and particle transport can be classified as active transport or passive transport. Active transport of permeate can be facilitated by pressure, concentration, chemical or electrical gradients of the membrane process.

An important membrane filtration operation is reverse osmosis (RO). RO technology is generally considered more economical and environmentally-friendly for water desalination process than other membrane filtration processes, but there is a significant and real need to improve the efficiency of all membrane filtration operations (including RO filtration processes). By various estimates, RO technology represents over 65% of the world's desalination market and this share is expected to increase rapidly in the future.

The bulk of water purification, such as that provided through an RO plant or system, is generally obtained using semipermeable membranes. Such semipermeable membranes generally permit passage of a solvent (e.g., water) without permitting passage of a solute (e.g. salt) carried in the solvent. If one side of the membrane has a higher concentration of salt or other solute than the other side, a portion of the water or other solvent can naturally migrate from the lower concentration side to the higher concentration side in an osmosis process that can work towards balancing the concentration levels on each side of the membrane.

A reverse osmosis (RO) water desalination filtration system generally contains one or more semi-permeable membrane that can be used to remove even the smallest contaminates from water, including salts and other substances dissolved in seawater. Under normal conditions, osmotic pressure will cause water to move through a semi-permeable membrane from an area of low salt concentration to an area of higher salt concentration until the solute concentration essentially equilibrates across the membrane.

If pressure is applied to the high concentration side, the water or other solvent may undergo a reverse osmosis (RO) process and instead pass from the higher concentration side to the lower concentration side. In effect, this applied driving pressure increases the solute concentration on the higher concentration side and decreases the solute concentration on the lower concentration side, resulting in a purified stream of water or other solvent on the lower concentration side. Put another way, in a reverse osmosis process, driving pressure greater than the osmotic pressure is applied to the system causing the water to move in the reverse direction, meaning water will be driven away from the area of higher salt concentration.

When the driving pressure is applied to the reverse osmosis system, the water will pass through (or permeate) the semi-permeable membrane leaving the dissolved solutes and microorganisms, such as salts and bacteria, behind, and will begin to produce a water product (called permeate) that has a substantially reduced solute concentration. The purified stream of water or other solvent may be routed along additional membranes and/or subject to additional treatment processes in order to further improve the purity obtained through such RO plants or systems.

Membrane Fouling

Membrane fouling is the accumulation of any material on the membrane and surrounding environs that inhibits the flow over the membrane and decreases the ability of the membrane to function adequately. Fouling decreases the life of the membrane and reduces the quality of the desired filtered end product.

Biofouling is the gradual accumulation of organisms on surfaces to the detriment of the function of the surface, and of particular relevance herein are those organisms that produce biofilms. Biofilm formation is caused by the accumulation of microorganisms and extracellular polymeric substances (EPS) produced by the microorganisms. Biofilms can form on a variety of surfaces including membranes (e.g., in membrane filtration systems), heat exchangers, medical devices, paper manufacturing systems, food processing systems, and in underwater construction. Biofilm formation, which occurs frequently in membrane filtration systems, causes biofouling, which is an unacceptable decline in membrane performance. Additionally, a hydrodynamic boundary layer generally exists adjacent to the biofilm which reduces the flow of the feed water over the biofilm, thereby decreasing the ability of the feed water to dislodge the biofilm.

A biofilm is a bacterial aggregation on a surface with a structure that includes bacterial cells and a matrix of bacterially produced extracellular polymeric substances (EPS), along with biogenic and inorganic particles. Extracellular polymeric substances EPS, which are primarily composed of proteins, polysaccharides, and nucleic acids, play a vital role in biofilm growth and development. As a result, the extracellular polymeric substances can alter the density, porosity, charge, water content, and sorption properties of the biofilm with time.

While membranes used for water desalination within the last two decades have increased membrane energy efficiency and performance of the RO processing systems (resulting in higher quality potable water production), a major cost associated with membrane based operational failure results from biological fouling (biofouling). Biofouling occurs in over 40% of Reverse Osmosis (RO) desalination plants, and such biofouling inhibits the function of the reverse osmosis membrane and reduces the usable life of the membranes.

Despite extensive pretreatment (e.g. chemical treatment, dissolved air flotation, ultrafiltration) of water or other solvent prior to introduction into RO units, membrane fouling (such as biofouling) remains a serious and challenging problem in RO operations. Fouling can reduce an RO system's performance, product quality and quantity, and may require frequent membrane cleaning using chemicals (which may not be environmentally friendly). There exists a need for technology that improves reverse osmosis membrane filtration by reducing biofouling in order to increase the efficiency of water desalination.

SUMMARY OF THE INVENTION

The present invention is a spacer for use in a reverse osmosis membrane filter in a spiral wound configuration with layers of semi-permeable membrane stacked together with permeate carrier layers (which move the purified water to a permeate collection tube) and feed spacer layers (which separate the reverse osmosis membranes and allow flow space for the feed solution). The system is sealed on three sides to separate the filtered (low salt) permeate from the non-filtered (high salt) feed solution, and the multiple layers are wrapped around a perforated tube that collects the permeate water product as an output of the membrane filtration system.

The present invention is a spacer that can also be configured for use in a stacked assembly between a membrane and a surface, and allows for a volume of fluid to flow between the membrane and the surface. The spacer of the present invention is configured to reduce fouling of the membrane by improving the flow of the fluid volume through the stacked assembly. The spacer of the present invention is useful for stacked assembly configurations including, but not limited to, flat sheet modules, plate and frame modules, hollow fiber modules, casket/disc modules, and spiral wound modules.

The spacer of the present invention is configured for use in stacked assembly in which the membrane comprises a first membrane and the surface optionally comprises a surface of a second membrane and has at least one of the apertures of the plurality of apertures has boundaries forming a diamond-shape, a rhombus-shape, or a square-shape, and the baffles of the plurality of baffles may be formed with at least a portion thereof having a helical shape. In this system, the present invention is a spacer configured to be received in a stacked assembly between a membrane and a surface so that the surface, spacer, and membrane are stacked in a first direction, the spacer being configured to be received in the stacked assembly so as to provide a volume for fluid flow between the membrane and the surface in a second direction transverse to the first direction.

The spacer in the present invention has a plurality of baffles interconnected together, a body formed at least in part by the plurality of baffles where the body has a thickness direction oriented in the first direction when the spacer is received in the stacked assembly, a plurality of apertures extending through the body in the thickness direction and permitting fluid flow there through when fluid flows through the stacked assembly in the second direction, and the apertures having boundaries defined at least in part by the plurality of baffles.

The spacer of the present invention includes one or more perforation disposed within and through one or more baffle of the plurality of baffles so as to permit fluid flow through one or more baffle when fluid flows through the stacked assembly in the second direction.

The spacer in the present invention has a plurality of joints interconnecting at least some of the baffles of the plurality of baffles, wherein at least one of the joints of the plurality of joints is larger in the thickness direction than at least one of the baffles of the plurality of baffles.

The spacer of the present invention includes one or more perforation disposed within and through one or more joint of the plurality of joints so as to permit fluid flow through one or more joint when fluid flows through the stacked assembly in the second direction.

Alternatively, the spacer in the present invention as used in a multiple layer membrane filtration system has a plurality of baffles interconnected together, one or more of the baffles of the plurality of baffles formed with at least a portion thereof having a helical shape; a body formed at least in part by the plurality of baffles, the body having a thickness direction oriented in the first direction when the spacer is received in the stacked assembly; a plurality of apertures extending through the body in the thickness direction and permitting fluid flow there through when fluid flows through the stacked assembly in the second direction, the apertures having boundaries defined at least in part by the plurality of baffles; and a plurality of joints interconnecting at least some of the baffles of the plurality of baffles, wherein at least one of the joints of the plurality of joints is larger in the thickness direction than at least one of the baffles of the plurality of baffles.

Also, the spacer of the present embodiment can be configured for use in stacked assembly in which the membrane comprises a first membrane and the surface optionally comprises a surface of a second membrane, and at least one of the apertures of the plurality of apertures has boundaries forming a square-shape, a diamond-shape, a rhombus-shape, or a circular shape. This embodiment of the present invention can have one or more perforations disposed within and through one or more baffle of the plurality of baffles or one or more joint of the plurality of joints so as to permit fluid flow through the respective baffle or joint when fluid flows through the stacked assembly in the second direction.

The present invention can also include a spacer in a multiple layer membrane filtration system that has a plurality of baffles interconnected together; a body formed at least in part by the plurality of baffles, the body having a thickness direction oriented in the first direction when the spacer is received in the stacked assembly wherein the body is a plate formed at least in part by the plurality of baffles interconnected together; a plurality of apertures extending through the body in the thickness direction and permitting fluid flow there through when fluid flows through the stacked assembly in the second direction, the apertures having boundaries defined at least in part by the plurality of baffles; wherein the plurality of baffles define circular perimeter boundaries for the plurality of apertures of different sizes so as that the plurality of apertures includes a first subset of apertures and a second subset of apertures, the apertures in the first subset being larger than in the second subset, and each aperture in the second subset being adjacent on all sides to apertures in the first subset.

The spacer of the present invention can also be configured for use in stacked assembly in which the membrane comprises a first membrane and the surface optionally comprises a surface of a second membrane, and at least one of the baffles of the plurality of baffles is formed with at least a portion thereof having a helical shape. This embodiment of the invention can also possess a plurality of projections extending away from the body in the thickness direction so as to prevent the membrane from abutting the baffles of the plurality of baffles when the spacer is received in the stacked assembly and also optionally further comprises at least one perforation disposed within and through a respective baffle of the plurality of baffles so as to permit fluid flow through the respective baffle when fluid flows through the stacked assembly in the second direction.

BRIEF DESCRIPTION OF THE DRAWINGS

The above, and other objects and advantages of the present invention will be understood upon consideration of the following detailed description taken in conjunction with the accompanying drawings, in which like reference characters refer to like parts throughout, and in which.

Figure 1A:
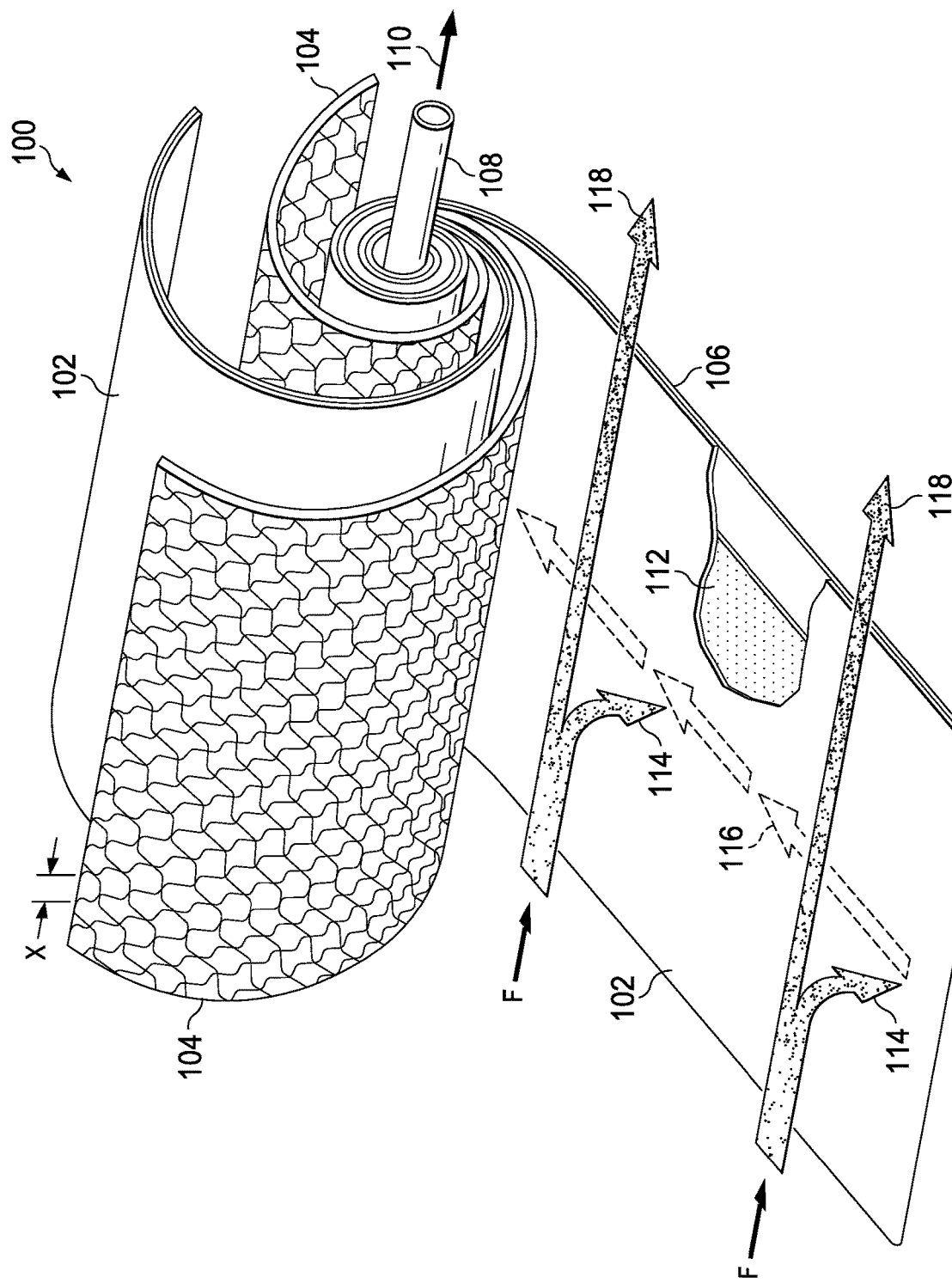
FIG. 1A is a spiral wound membrane filtration unit with the layers unwrapped.
Figure 1B:
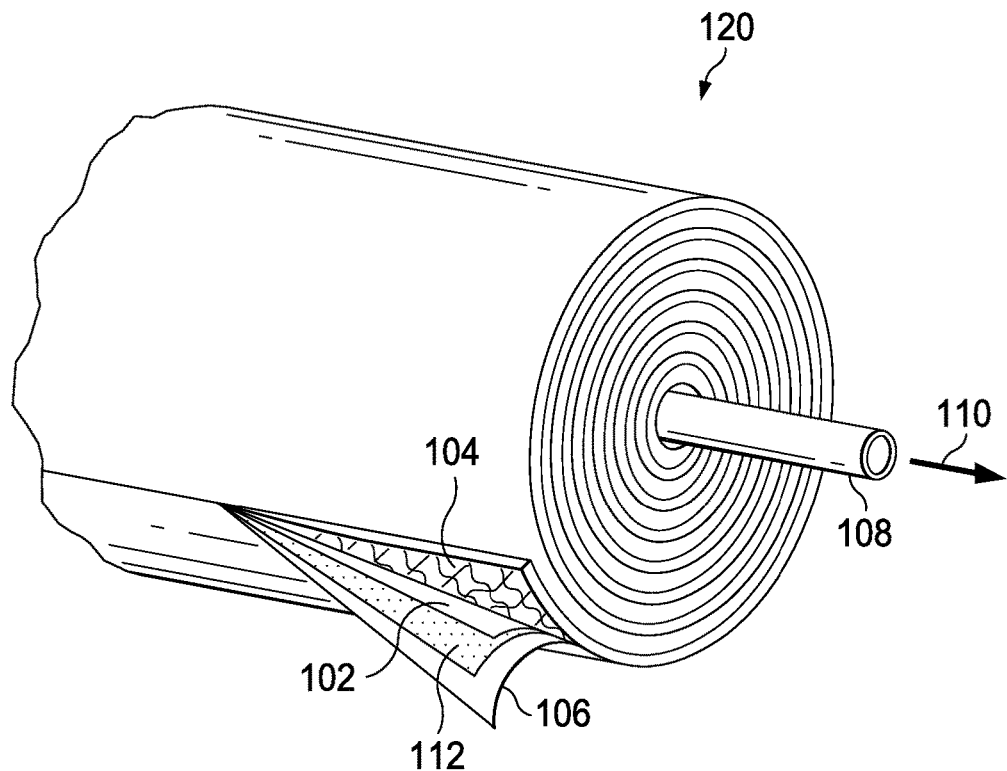
Figure 1C:
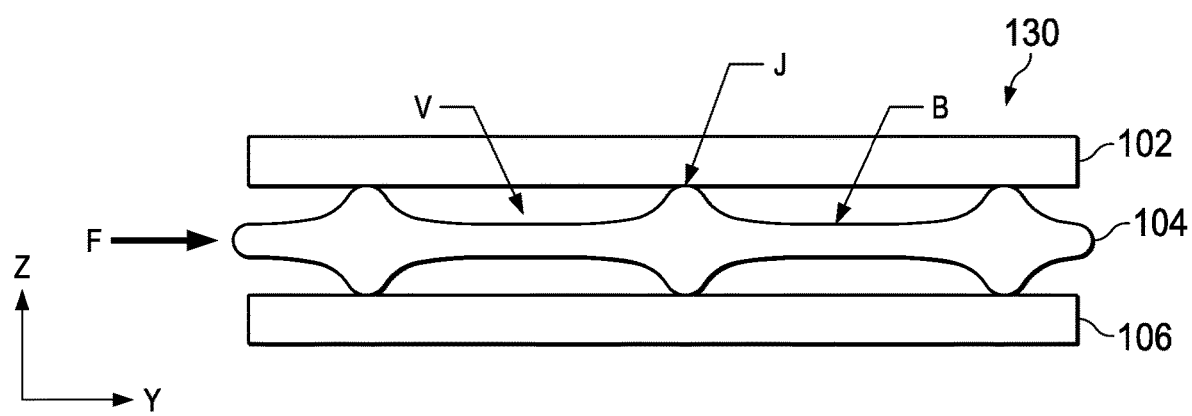
Figure 2:
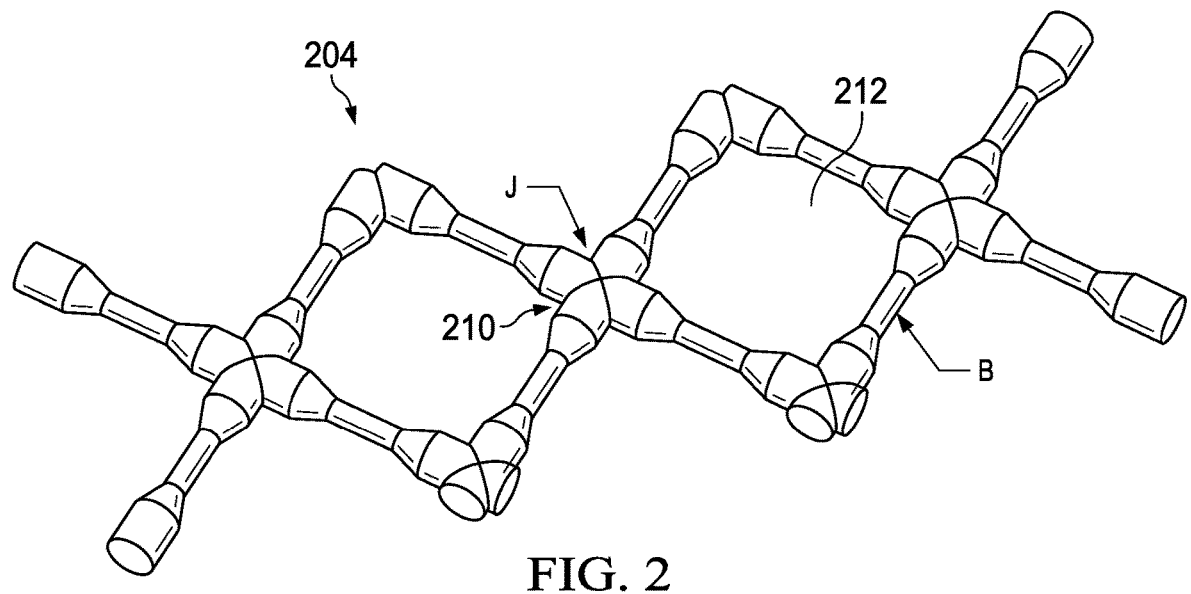
Figure 3:
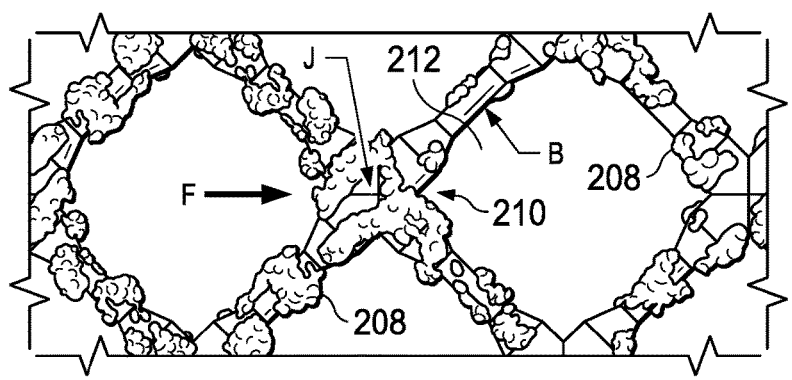
Figure 4:
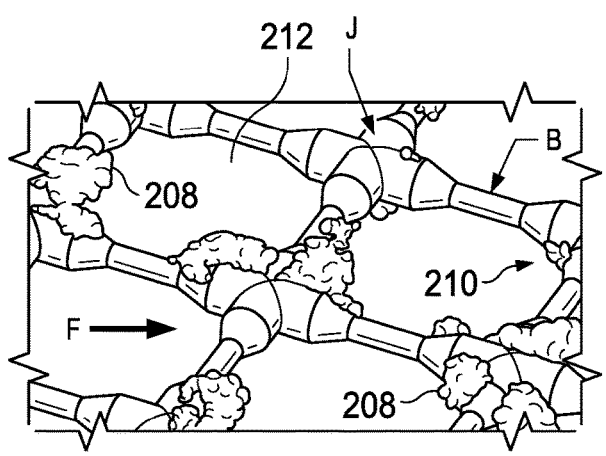
Figure 5:
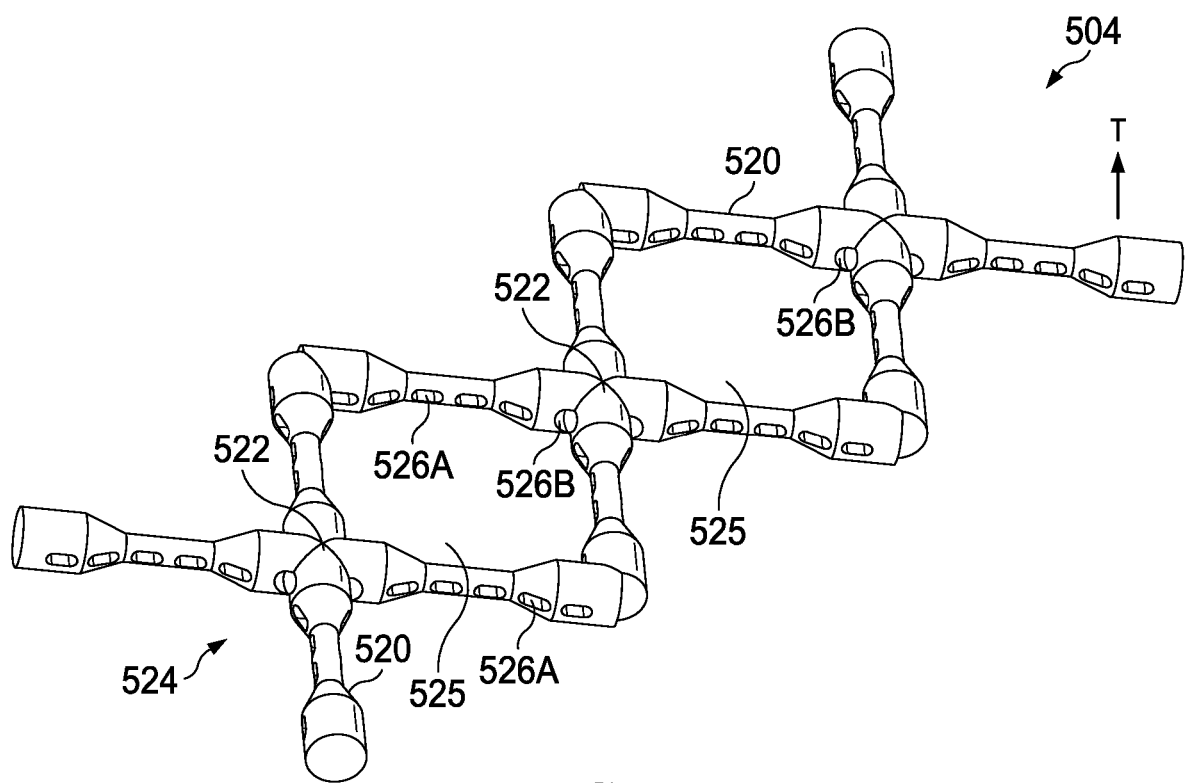
Figure 6A:
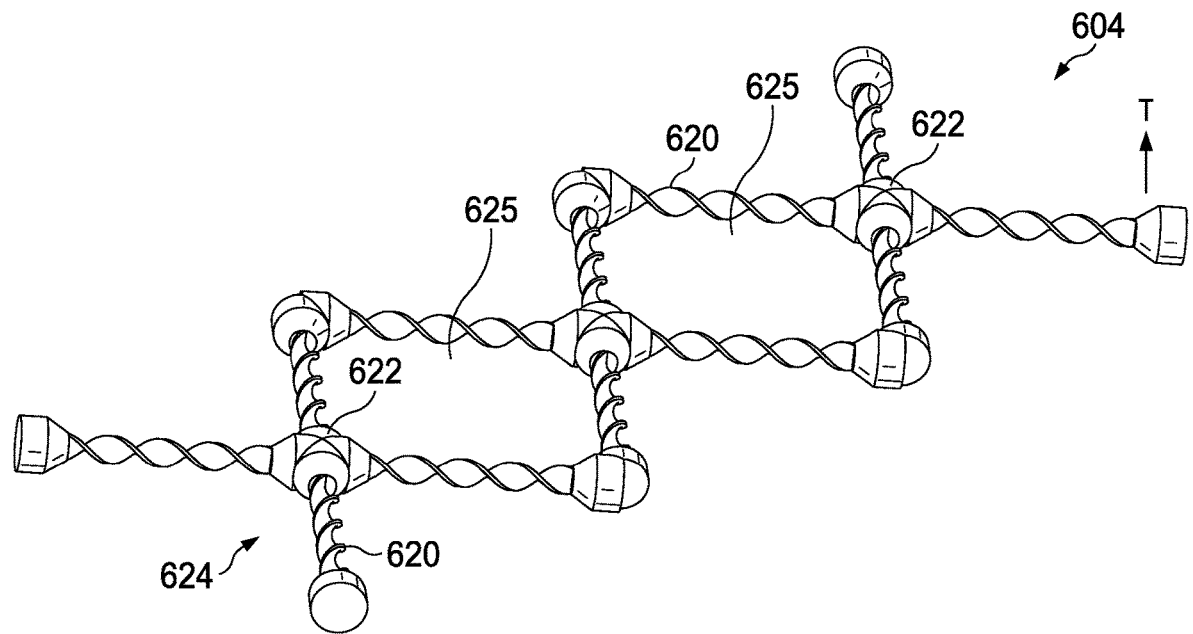
Figure 6B:
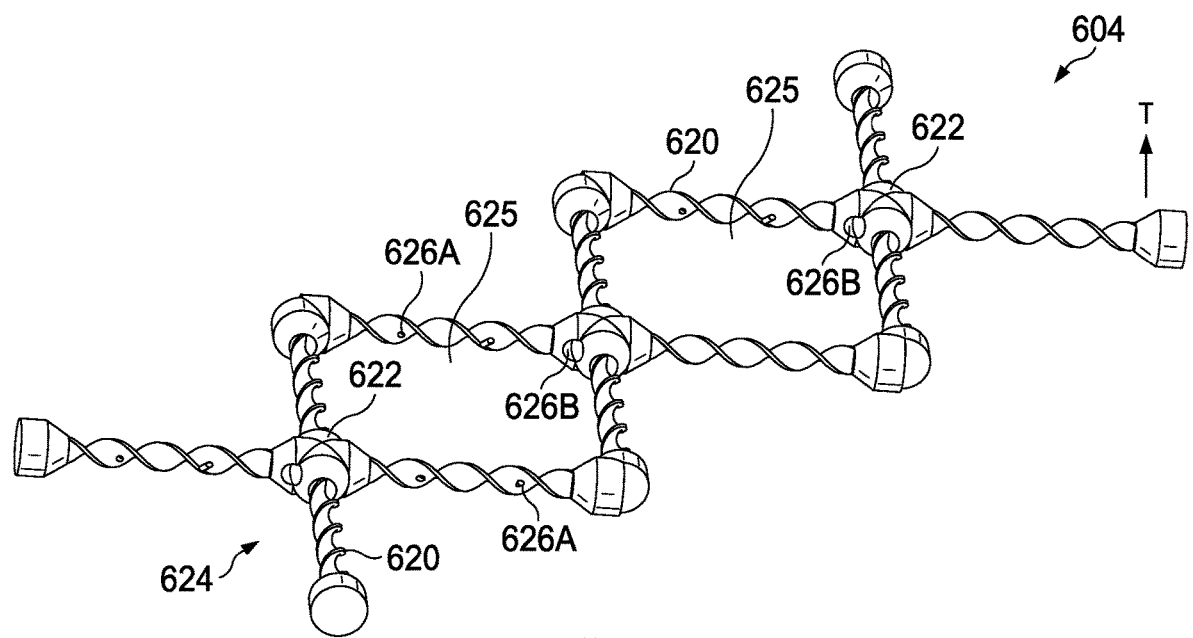
Figure 7A:
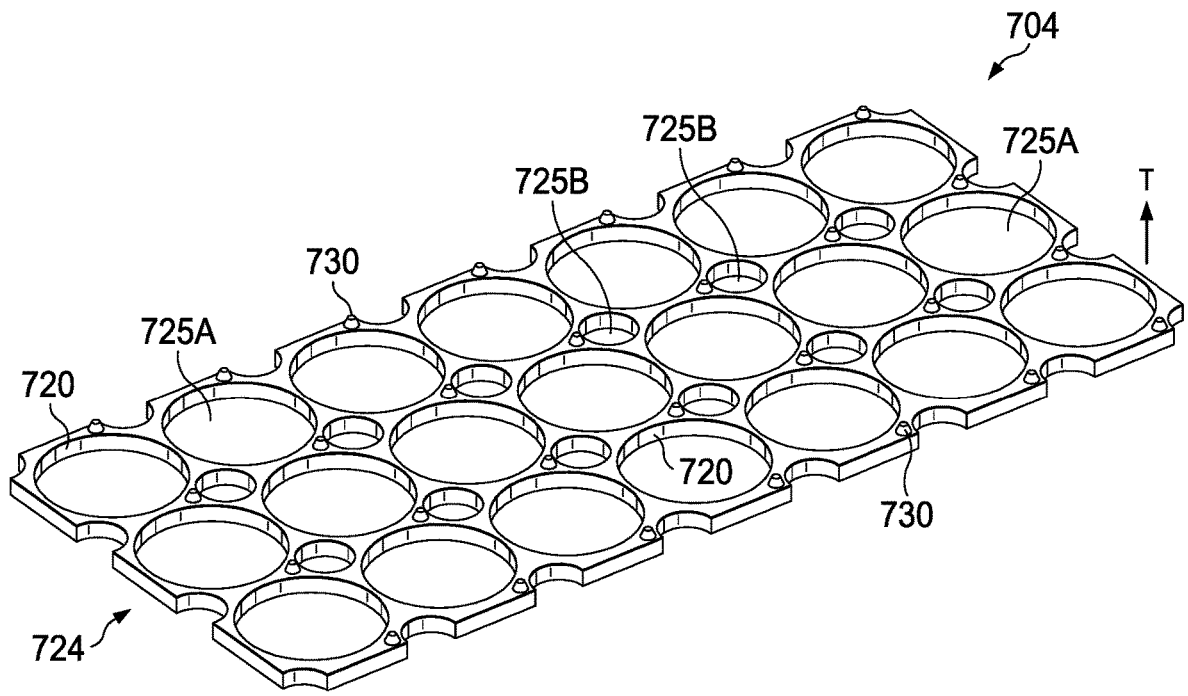
Figure 7B:
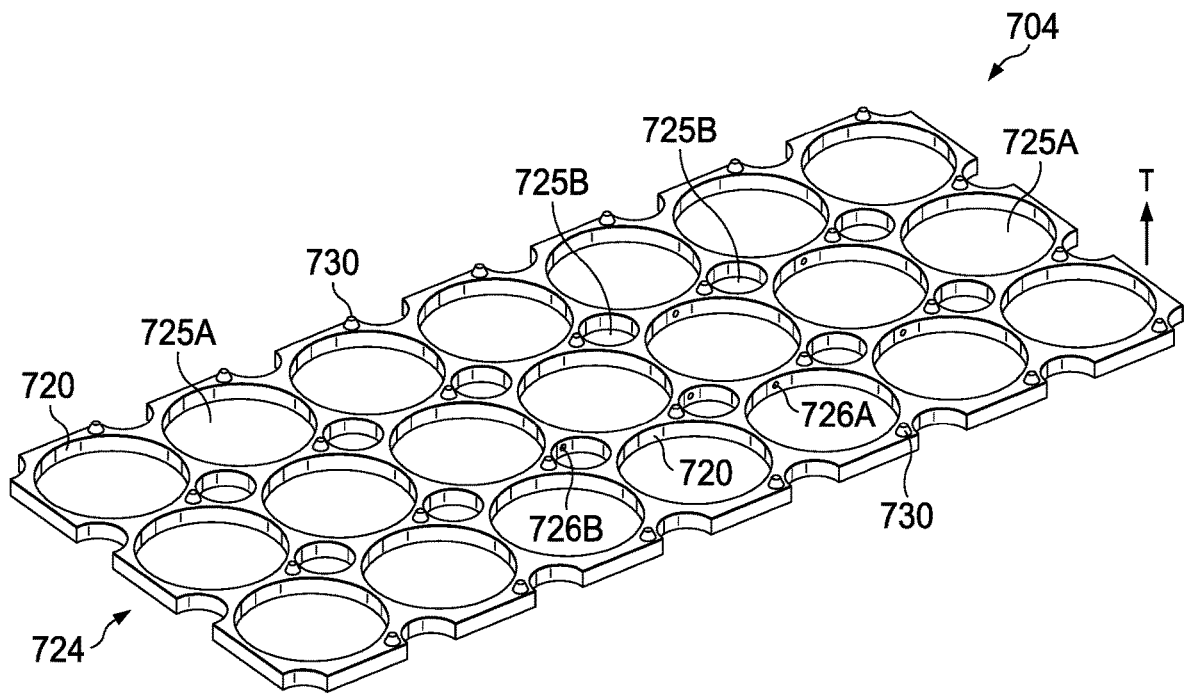
Figure 8C:
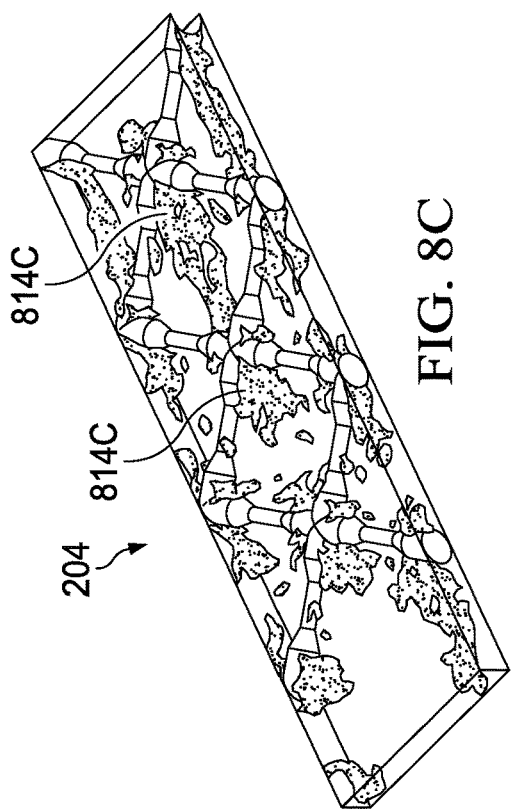
Figure 8D:
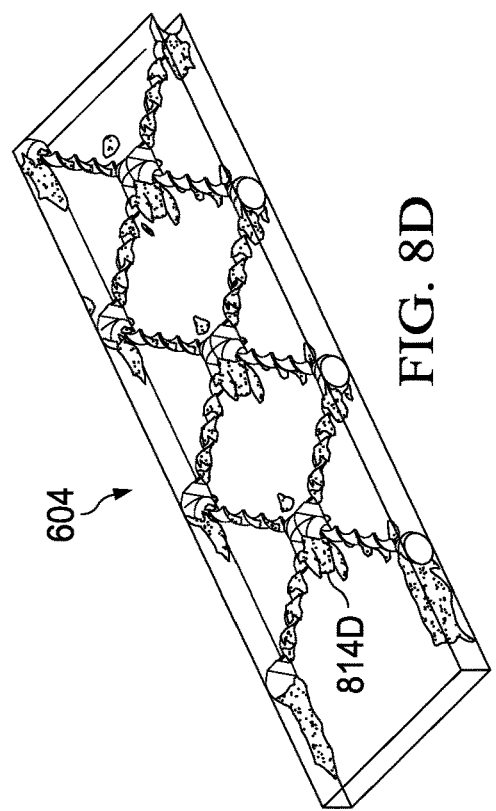
Figure 8A:
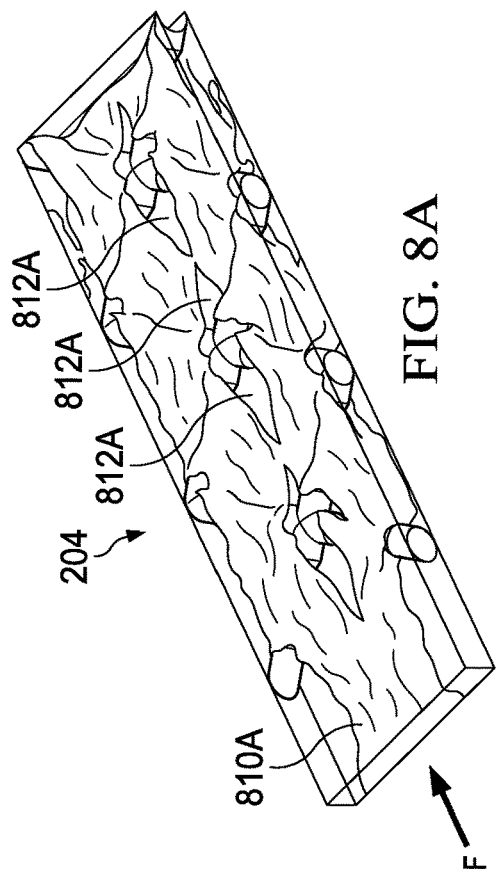
Figure 8B:
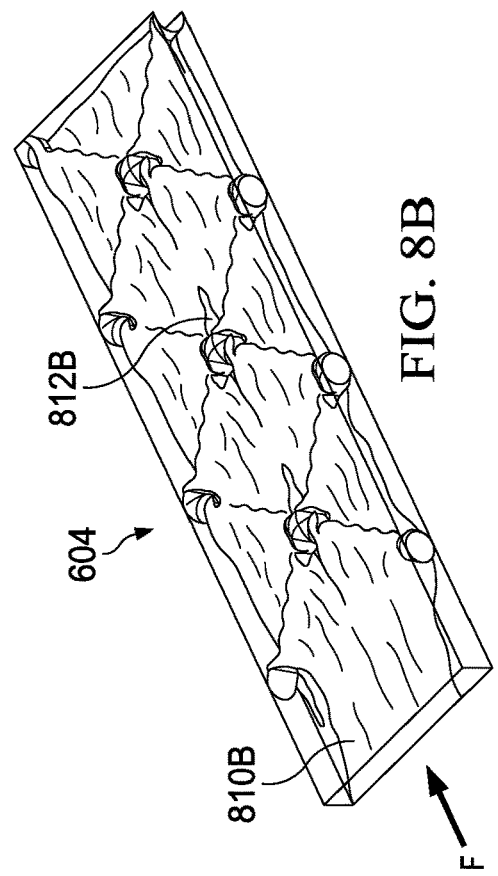

1B is a spiral wound membrane filtration unit with the layers wrapped around a permeate collection tube;

FIG. 1C is a cross-sectional view of a spacer in a stacked assembly in accordance with certain embodiments;

FIGS. 2-4 show perspective and top views of a prior art conventional spacer and illustrate problems with biofouling that may occur therewith;

FIG. 5 shows a perspective view of a spacer of the present invention including perforations;

FIG. 6A shows a perspective view of a spacer of the present invention including helical baffles;

FIG. 6B shows a perspective view of a spacer of the present invention including helical baffles and perforations;

FIG. 7A shows a perspective view of a spacer of the present invention including an arrangement of curved boundaries;

FIG. 7B shows a perspective view of a spacer of the present invention including an arrangement of curved boundaries and perforations;

FIGS. 8A and 8C show a perspective view of a prior art spacer shown in FIGS. 2-4 after encountering a simulated flow over different time periods; and, FIGS. 8B and 8D show a perspective view of a spacer of the present invention shown in FIG. 6A encountering a simulated flow over the same different time periods encountered in FIGS. 8A and 8C.

While the invention is susceptible to various modifications and alternative forms, specific embodiments thereof have been shown by way of example in the drawings and are herein described in detail. It should be understood that the description herein of specific embodiments is not intended to limit the invention to the particular forms disclosed, but on the contrary, the intention is meant to cover all modifications, equivalents, and alternatives falling within the spirit and scope of the invention as defined by the appended claims.

DETAILED DESCRIPTION

The spacer of the present invention is described for use with a spiral wound membrane configuration. In a spiral wound configuration, layers of a semi-permeable membrane are stacked together with permeate carrier layers, which move the purified water to a permeate collection tube. Layers of feed spacer are also alternated and stacked between membrane layers and/or between the membrane layer and the outer surface layers of the spiral wound configuration. The present invention is a spacer configured for use in a stacked assembly between a membrane and a surface, and allows for a volume of fluid to flow between the membrane and the surface. The spacer of the present invention is configured to reduce fouling of the membrane by improving the flow of the fluid volume through the stacked assembly. The spacer of the present invention is useful for stacked assembly configurations including, but not limited to, flat sheet modules, plate and frame modules, hollow fiber modules, casket/disc modules, and spiral wound modules. In a water desalination process, stacked assemblies having a spacer between a membrane and one or more surface are used to assist fluid flow over a membrane surface. Use of the spacer in stacked assembly configurations for a variety of filtration systems, such as flat sheet modules, plate and frame modules, hollow fiber modules, casket/disc modules, and spiral wound modules, is envisioned for the present invention as described herein.

The feed spacer layers separate the reverse osmosis membranes and allow flow space for the feed solution, and all these layers are wrapped around a perforated tube that collects the permeate water product. The system is sealed on three sides to separate the filtered (low salt) permeate from the non-filtered (high salt) feed solution.

A spiral wound reverse osmosis membrane filtration system works on the cross-flow filtration principle. Unlike some types of filtration with only feed solution streams and product streams, cross-flow filtration has three streams, which include a feed solution stream, a permeate stream and a retentate (or concentrate) stream.

When the driving pressure is applied to spiral wound reverse osmosis membranes, the feed solution stream containing water with high levels of dissolved solutes enters the spiral wound reverse osmosis membrane element. In this environment, the water has a reduced solute concentration (permeate). The concentrate or retentate stream contains substances that are rejected by the reverse osmosis membrane, such as salts or other minerals.

To create a channel for the feed solution stream to travel across the membranes and to create turbulence within the feed stream, feed spacers or spacer layers are placed between the semipermeable membrane layers. The turbulence assists with mixing the incoming feed solution with the concentrated solutes retained near the membrane surface. The feed spacers can become blocked, or biofouled, by materials such as bacteria and other biological substances, that may be in the feed stream. Such biofouling inhibits the function of the reverse osmosis membrane and can reduce the usable life of the membranes.

Disclosed herein is the present spacer invention that is utilized in filtration systems such as nano-filtration systems, reverse osmosis filtration systems, or other stacked assemblies wherein membranes are separated by a spacer to facilitate flow across the membranes. The spacers include features that affect flow over, around, and/or along the spacers. The flow patterns provided by such features result in reduced fouling in comparison to that encountered in association with other types of spacers. Other configurations can be used with the present spacer inventions. For example, a reverse osmosis membrane can be configured in flat sheet membranes, plate and frame membranes, or spiral wound membranes. Membrane configurations can also include spiral wound, hollow fiber, and sheet with spiral configurations. Contemporary membranes are primarily polymeric materials with cellulose acetate still used to a much lesser degree, but any type of membrane can be used with the present spacer invention to reduce biofouling.

FIG. 1A is a simplified diagram of a spiral wound filtration module configuration 100 with the membrane and spacer layers unwrapped. One or more semi-permeable membranes 102 and 106 are stacked with one or more spacers 104 placed there between to separate the membrane layers 102 and facilitate flow (F) of a feed solution over a membrane 102. The spacers 104 contact the stacked membranes 102 to provide uniform separation, while openings (X) in the spacers 104 provide voids for the feed solution flow (F) to contact the membrane 102. The spacers have an opening or mesh size (X) that may vary in size depending on the specific application.

As the feed solution flow (F) passes over the membranes 102 in the F direction, the pressure of the reverse osmosis system causes water in the feed solution to move or permeate in the 114 direction through the membrane 102. The water permeate reaches the permeate carriers 112. The filtered water, now permeate, travels along the permeate carriers 112 flowing directionally along the permeate flow path 116 to the permeate collection tube 108. Once filtered water permeate reaches the collection tube 108, permeate will flow out of the collection tube 108 in the direction indicated by the arrow 110 and be collected downstream of the filtration system.

The feed solution flow (F) that passes over the membranes 102 and does not permeate through to the permeate carrier 112 in the 114 direction, will continue to move along retentate flow path in the 118 direction. This retentate will carry salts and other materials that are not transmitted through the membranes 102. The solute concentration in the retentate flow of 118 will increase as it flows over the membranes along the retentate path 118, with the retentate being collected downstream of the filtration system, where it may be further processed or disposed.

FIG. 1B is a diagram of a spiral wound filtration module configuration 120 with the membrane and spacer layers seen in FIG. 1A wrapped around a permeate collection tube 108. When the membrane 102, spacer 104 and permeate carriers 112 layers are wrapped together around the permeate collection tube 108, the edges of the wrapped layers are seal on three sides to direct the unfiltered feed solution flow (F) across the membranes 102 and to keep the purified water in the permeate carrier 112 and permeate collection tube 108 separated from the feed solution and retentate.

While FIGS. 1A and 1B are directed to a spiral wound configuration, the spacers disclosed herein are not limited to spiral wound systems. The spacer layers are applicable to any filtration system that employs a stacked membrane configuration, including but not limited to flat sheet membranes, or plate and frame membranes. Disclosed herein is the present spacer invention that is utilized in filtration systems such as nano-filtration systems, reverse osmosis filtration systems, or other stacked assemblies wherein membranes are separated by a spacer to facilitate flow across the membranes. The spacers include features that affect flow over, around, and/or along the spacers. The flow patterns provided by such features result in reduced fouling in comparison to that encountered in association with other types of spacers. Other configurations can be used with the present spacer inventions. For example, a reverse osmosis membrane can be configured in flat sheet membranes, plate and frame membranes, or spiral wound membranes. Membrane configurations can also include spiral wound, hollow fiber, and sheet with spiral configurations. Contemporary membranes are primarily polymeric materials with cellulose acetate still used to a much lesser degree, but any type of membrane can be used with the present spacer invention to reduce biofouling.

FIG. 1C is a cross-section illustration of a stacked assembly 130 having a membrane layer 102, a spacer 104, and a surface or another membrane layer 106. These layers can be wound around a permeate collection tube 108 in a spiral wound module configuration. The spacer layer 104 is configured to be received in the stacked assembly 130 between the membrane 102 and the surface (or other membrane) 106 so that the surface 106, spacer 104, and membrane 102 are stacked in a first direction Z illustrated as a vertical direction towards the top of the page in FIG. 1C. The spacer 104 is configured to be received in the stacked assembly 130 so as to provide a volume V for fluid flow F between the membrane 102 and the surface layer 106. For example, fluid flow F may be oriented to travel through the volume V in a second direction Y that is perpendicular to, or otherwise transverse to, the first direction Z.

The spacer 104 can include joints J or other structures that extend away from a body B of the spacer 104. In some aspects, the joints J support the membrane 102 spaced apart from the body B such as to facilitate fluid flow F through the volume V. The fluid flow F through the volume V may correspond to a pressurized source of water or another solvent carrying salt or another solute in, for example, an RO system. Thus, the membrane 102 may correspond to a suitable membrane for RO processes, such as those types of membranes utilized in desalination operations for obtaining potable water from saltwater. Although solvents other than water and solutes other than salt may be used with the present spacer invention, the present embodiments are described with respect to an RO membrane filtration system for simplicity and only by way of example. Furthermore, for simplicity and only by way of example, the subsequent description herein primarily references water and salt as the primary solvent and solute, although other components, elements and minerals may be encountered through the use of the present invention.

The spacer of the present invention is configured for use in stacked assembly in which the membrane comprises a first membrane and the surface optionally comprises a surface of a second membrane and has at least one of the apertures of the plurality of apertures has boundaries forming a diamond-shape, a rhombus-shape, or a square-shape, and the baffles of the plurality of baffles may be formed with at least a portion thereof having a helical shape. In this system, the present invention is a spacer configured to be received in a stacked assembly between a membrane and a surface so that the surface, spacer, and membrane are stacked in a first direction, the spacer being configured to be received in the stacked assembly so as to provide a volume for fluid flow between the membrane and the surface in a second direction transverse to the first direction.

The spacer in the present invention has a plurality of baffles interconnected together, a body formed at least in part by the plurality of baffles where the body has a thickness direction oriented in the first direction when the spacer is received in the stacked assembly, a plurality of apertures extending through the body in the thickness direction and permitting fluid flow there through when fluid flows through the stacked assembly in the second direction, and the apertures having boundaries defined at least in part by the plurality of baffles; and a plurality of perforations each disposed within and through one or more baffle of the plurality of baffles so as to permit fluid flow through one or more baffle when fluid flows through the stacked assembly in the second direction.

The spacer in the present invention has a plurality of joints interconnecting at least some of the baffles of the plurality of baffles, wherein at least one of the joints of the plurality of joints is larger in the thickness direction than at least one of the baffles of the plurality of baffles, and wherein one or more of the joints of the plurality of joints further comprises one or more perforation there through that permits fluid flow there through when fluid flows through the stacked assembly in the second direction.

Alternatively, the spacer in the present invention as used in a multiple layer membrane filtration system has a plurality of baffles interconnected together, one or more of the baffles of the plurality of baffles formed with at least a portion thereof having a helical shape; a body formed at least in part by the plurality of baffles, the body having a thickness direction oriented in the first direction when the spacer is received in the stacked assembly; a plurality of apertures extending through the body in the thickness direction and permitting fluid flow there through when fluid flows through the stacked assembly in the second direction, the apertures having boundaries defined at least in part by the plurality of baffles; and a plurality of joints interconnecting at least some of the baffles of the plurality of baffles, wherein at least one of the joints of the plurality of joints is larger in the thickness direction than at least one of the baffles of the plurality of baffles.

Also, the spacer of the present embodiment can be configured for use in stacked assembly in which the membrane comprises a first membrane and the surface optionally comprises a surface of a second membrane, and at least one of the apertures of the plurality of apertures has boundaries forming a square-shape, a diamond-shape, a rhombus-shape, or a circular shape. This embodiment of the present invention can have one or more perforations disposed within and through one or more baffle of the plurality of baffles or one or more joint of the plurality of joints so as to permit fluid flow through the respective baffle or joint when fluid flows through the stacked assembly in the second direction.

The present invention can also include a spacer in a multiple layer membrane filtration system that has a plurality of baffles interconnected together; a body formed at least in part by the plurality of baffles, the body having a thickness direction oriented in the first direction when the spacer is received in the stacked assembly wherein the body is a plate formed at least in part by the plurality of baffles interconnected together; a plurality of apertures extending through the body in the thickness direction and permitting fluid flow there through when fluid flows through the stacked assembly in the second direction, the apertures having boundaries defined at least in part by the plurality of baffles; wherein the plurality of baffles define circular perimeter boundaries for the plurality of apertures of different sizes so as that the plurality of apertures includes a first subset of apertures and a second subset of apertures, the apertures in the first subset being larger than in the second subset, and each aperture in the second subset being adjacent on all sides to apertures in the first subset.

The spacer of the present invention can also be configured for use in stacked assembly in which the membrane comprises a first membrane and the surface optionally comprises a surface of a second membrane, and at least one of the baffles of the plurality of baffles is formed with at least a portion thereof having a helical shape. This embodiment of the invention can also possess a plurality of projections extending away from the body in the thickness direction so as to prevent the membrane from abutting the baffles of the plurality of baffles when the spacer is received in the stacked assembly and also optionally further comprises at least one perforation disposed within and through a respective baffle of the plurality of baffles so as to permit fluid flow through the respective baffle when fluid flows through the stacked assembly in the second direction.

The stacked assembly 130 shown in FIG. 1C corresponds to a flat sheet spiral wound RO membrane unit, such as those that presently dominate the desalination market as illustrated by FIGS. 1A and 1B. Additionally or alternatively, the stacked assembly 130 may correspond to other forms of RO systems, which may include, e.g., flat sheet membrane systems or plate and frame membrane systems. In some embodiments, the surface 106 corresponds to another membrane within an RO system, which may be identical to, similar to, or different from, the membrane 102, for example, according to the particular functionality of the RO system.

Disclosed herein is the present spacer invention that is utilized in filtration systems such as nano-filtration systems, reverse osmosis filtration systems, or other stacked assemblies wherein membranes are separated by a spacer to facilitate flow across the membranes. The spacers include features that affect flow over, around, and/or along the spacers. The flow patterns provided by such features result in reduced fouling in comparison to that encountered in association with other types of spacers. The spacer 104 (sometimes referred to as a feed spacer) can be used for a variety of functions individually or in combination.

Non-limiting examples of such functions include to separate membrane sheets, to direct feed water towards the membrane 102, to create unsteadiness/turbulence that aids in reducing a risk and/or extent of a concentration polarization within an RO system, and to maximize operational performance. Other configurations can be used with the present spacer inventions. For example, a reverse osmosis membrane can be configured in flat sheet membranes, plate and frame membranes, or spiral wound membranes. Membrane configurations can also include spiral wound, hollow fiber, and sheet with spiral configurations. Contemporary membranes are primarily polymeric materials with cellulose acetate still used to a much lesser degree, but any type of membrane can be used with the present spacer invention to reduce biofouling.

In various scenarios, membranes and, more specifically, spacers 104 in a stacked assembly 130 can become a significant source or cause of fouling, especially biofouling (e.g., within a RO system). Warm saltwater or other environments prone to growth or accumulation of foulants (e.g., bacteria) exacerbate this phenomenon. Spacers 104 often provide a suitable structure on which foulants accumulate and grow. In many instances, foulants accumulated on spacers 104 may in turn spread to or otherwise accumulate on the membrane 102, which may lead to severe clogging of the membrane 102 and impaired functionality of the system. This impaired function requires, in many cases, complete system shut-down to allow for cleaning or replacement of components of the filtration system. Cleaning often requires mechanical processes and/or harsh chemicals, which further require time for adequately flushing the system of contaminants after cleaning is performed.

FIGS. 2-4 show this bio-foulant problem with respect to a conventional prior art spacer 204. The geometry of the spacer 204 shown in FIG. 2 can result in accumulation of foulants, such as illustrated in FIGS. 3 and 4. Feed water flows (F) over the spacer body B, around the joints (J) and through the open areas, or apertures, 212 in the spacer. The feed solution flow (F) contacts the membranes in these apertures 212.

Often, biofouling may be observed starting at angled junctures 210 that occur where the body B members meet at the joints J on the spacer 204, progressively developing throughout the whole body of the spacer 204, and ultimately scavenging a surface of the membrane 102. As may be appreciated with respect to FIGS. 3 and 4, biofouling 208 may be initially detected especially at angled junctures 210, and/or in other separated zones with minimal fluid flow or other "steady-state" conditions. Biofouling 208 may also extend to the spacer body B.

In some cases, separated zones may be formed due to separation of flow streams traveling around angled junctures 210 or other structure of the spacer 204. In many cases, these separated zones also accumulate nutrients and/or foulants (e.g., due to constant recirculation of fluid in the separated zone) from the feed water, which further stimulate bacterial colonization, production of extracellular polymeric substances and biofilm formation. Advanced or prolonged fouling results in feed flow channels clogging and/or accumulation on membrane surfaces that decreases water production and/or quality.

The present invention disclosed herein is used to reduce and/or minimize the steady separation zones and feed foulant and nutrient entrapment. The present invention spacers as disclosed herein additionally or alternatively optimize (e.g., increase and/or maximize) feed directivity to the membrane 102. The present spacer invention may additionally or alternatively increase and/or maximize unsteadiness and/or turbulence generation at an elemental level, which improves efficiency and effectiveness of the filtration and desalinization system. On a broader level, the present spacer invention improves life spans of membrane by minimizing major biofouling failures associated with filtration systems (e.g., RO systems), which currently account for about 35% of membrane failures by certain estimates.

FIG. 5 shows a perspective view of a spacer 504 according to certain embodiments of the invention disclosed herein. The spacer 504 may be used as spacer 104 indicated in FIG. 1C. In the illustrated embodiment, the spacer 504 includes baffles 520, joints 522, a body 524, apertures or openings 525, and perforations or passages 526 (e.g., individually identified in FIG. 5 as 526A, 526B etc.). The baffles 520 shown in FIG. 5 generally have a rod-like shape, but the baffles 520 may be configured in any other shapes or structures that provide an obstruction around and/or through which fluid flows when in a flow path of the fluid.

The baffles 520 can be interconnected together at joints 522. The body 524 is formed at least in part by the baffles 520 and further includes the joints 522. The body 524 has a thickness direction T, which may be oriented in the first direction Z (FIG. 1C) when the spacer 504 is received in a stacked assembly like 130 (FIG. 1C). The openings 525 can extend through the body 524 in the thickness direction T. Boundaries of the openings 525 may be formed at least in part by the baffles 520.

The openings 525 in FIG. 5 are shown with a square-shape but could be any of a variety of shapes, such as rhombus-shape, diamond-shape, polygon-shape, and rounded shapes (e.g., circles or ovals). The openings 525 permit fluid flow there through (e.g., in the thickness direction T), such as when fluid flow F (FIG. 1C) travels through the stacked assembly 130 in the second direction Y.

The joints 522 correspond to the joints J shown in FIG. 1C. For example, one or more of the joints 522 may be larger in the thickness direction T than at least one of the baffles 520 thereby providing space between the membrane 102 (FIG. 1C) and the baffles 520 through which fluid can flow to pass over the baffles 520 and through the apertures, or openings, 525. Such arrangements prevent significant portions of the spacer 504 from contacting the surface of the membrane 102, thus reducing a risk of damage to the membrane 102, and result in a reduced corresponding surface area of the spacer 504 and/or the membrane that yields a reduction in hydrodynamic drag.

The passages 526A and 526B can be arranged through a cross-section of body 524 of the spacer 504. Each of the passages 526A shown in FIG. 5 are disposed within and through a respective baffle 520. This arrangement permits fluid flow through the respective baffle 520 when fluid flow F travels through the stacked assembly 130, such as in the second direction Y. Each of the passages 526B shown in FIG. 5 are disposed within and through a respective joint 522, which permits fluid flow through the respective joint 522 when fluid flow F (FIG. 1C) travels through the stacked assembly 130, such as in the second direction Y.

Each passage 526A and 526B can be circular, elliptical, or any other shape, and may vary in shape and size along the passage 526 and/or in comparison to any other passage 526. Any suitable number of passages 526 can be utilized, and the number and/or shapes and/or sizes of passages 526 may be varied according to a particular application.

From a hydrodynamics perspective, the passages 526A and 526B act to manipulate the local hydrodynamics in the vicinity of the spacer 504. The entrance of a particular passage 526A and 526B act as a sink for incoming fluid flow, whereas, the exit of the passage 526A and 526B generate a free jet structure (e.g., leading to higher fluid velocities). Thus, the passages 526A and 526B are designed to facilitate flow stabilization and separation control.

The combination of such features and effects (especially in the vicinity of what might otherwise form a separation zone) reduces and/or eliminates seeding of biofilms. Furthermore, such features and effects additionally or alternatively result in the reduction in total hydrodynamic drag (e.g., yielding less restriction in the feed channel and/or the volume V of FIG. 1C), which in turn reduces and/or minimizes the overall operation cost of an RO system. Moreover, the amount of unsteadiness and/or turbulence in the system may be augmented due to local free jets at the exit of passages 526.

The present invention spacers 504 disclosed herein embodiments may be made of any material that can reliably separate the semi-permeable membranes without damaging the membranes or interfering with the osmotic filtration processes. Preferably, the present invention spacers are constructed of a polymer-based material having the strength and flexibility needed to maintain the structure of the disclosed spacers, with polypropylene optionally preferred for many applications.

The present invention spacers 504 disclosed herein can vary in size (thickness and aperture size, and optionally, strand size) depending on the specific filtration application. Feed spacer thickness can range from 25 µm to 3000 µm, inclusive, and more preferably have a thickness from 700 µm to 1200 µm, inclusive. Apertures, or openings, in the feed spacer optionally range in size from 0.5 mm×0.5 mm to 5.0 mm×5.0 mm, inclusive, and more preferably the apertures are 1.0 mm×1.00 mm to 3.0 mm×3.0 mm. Aperture sizes are described in terms of a square-shape, however the apertures can be any of a variety of shapes including, but not limited to, rectangular-shape, rhombus-shape, diamond-shape, polygon-shape, and rounded shapes (e.g., circles or ovals). Strand sizes optionally range from 5 strands/inch to 20 strands/inch, inclusive.

The spacer of the present invention is configured for use in stacked assembly in which the membrane comprises a first membrane and the surface optionally comprises a surface of a second membrane and has at least one of the apertures of the plurality of apertures has boundaries forming a diamond-shape, a rhombus-shape, or a square-shape, and the baffles of the plurality of baffles may be formed with at least a portion thereof having a helical shape. In this system, the present invention is a spacer configured to be received in a stacked assembly between a membrane and a surface so that the surface, spacer, and membrane are stacked in a first direction, the spacer being configured to be received in the stacked assembly so as to provide a volume for fluid flow between the membrane and the surface in a second direction transverse to the first direction.

The spacer in the present invention has a plurality of baffles interconnected together, a body formed at least in part by the plurality of baffles where the body has a thickness direction oriented in the first direction when the spacer is received in the stacked assembly, a plurality of apertures extending through the body in the thickness direction and permitting fluid flow there through when fluid flows through the stacked assembly in the second direction, and the apertures having boundaries defined at least in part by the plurality of baffles; and a plurality of perforations each disposed within and through one or more baffle of the plurality of baffles so as to permit fluid flow through one or more baffle when fluid flows through the stacked assembly in the second direction.

The spacer in the present invention has a plurality of joints interconnecting at least some of the baffles of the plurality of baffles, wherein at least one of the joints of the plurality of joints is larger in the thickness direction than at least one of the baffles of the plurality of baffles, and wherein one or more of the joints of the plurality of joints further comprises one or more perforation there through that permits fluid flow there through when fluid flows through the stacked assembly in the second direction.

Alternatively, the spacer in the present invention as used in a multiple layer membrane filtration system has a plurality of baffles interconnected together, one or more of the baffles of the plurality of baffles formed with at least a portion thereof having a helical shape; a body formed at least in part by the plurality of baffles, the body having a thickness direction oriented in the first direction when the spacer is received in the stacked assembly; a plurality of apertures extending through the body in the thickness direction and permitting fluid flow there through when fluid flows through the stacked assembly in the second direction, the apertures having boundaries defined at least in part by the plurality of baffles; and a plurality of joints interconnecting at least some of the baffles of the plurality of baffles, wherein at least one of the joints of the plurality of joints is larger in the thickness direction than at least one of the baffles of the plurality of baffles.

Also, the spacer of the present embodiment can be configured for use in stacked assembly in which the membrane comprises a first membrane and the surface optionally comprises a surface of a second membrane, and at least one of the apertures of the plurality of apertures has boundaries forming a square-shape, a diamond-shape, a rhombus-shape, or a circular shape. This embodiment of the present invention can have one or more perforations disposed within and through one or more baffle of the plurality of baffles or one or more joint of the plurality of joints so as to permit fluid flow through the respective baffle or joint when fluid flows through the stacked assembly in the second direction.

The present invention can also include a spacer in a multiple layer membrane filtration system that has a plurality of baffles interconnected together; a body formed at least in part by the plurality of baffles, the body having a thickness direction oriented in the first direction when the spacer is received in the stacked assembly wherein the body is a plate formed at least in part by the plurality of baffles interconnected together; a plurality of apertures extending through the body in the thickness direction and permitting fluid flow there through when fluid flows through the stacked assembly in the second direction, the apertures having boundaries defined at least in part by the plurality of baffles; wherein the plurality of baffles define circular perimeter boundaries for the plurality of apertures of different sizes so as that the plurality of apertures includes a first subset of apertures and a second subset of apertures, the apertures in the first subset being larger than in the second subset, and each aperture in the second subset being adjacent on all sides to apertures in the first subset.

The spacer of the present invention can also be configured for use in stacked assembly in which the membrane comprises a first membrane and the surface optionally comprises a surface of a second membrane, and at least one of the baffles of the plurality of baffles is formed with at least a portion thereof having a helical shape. This embodiment of the invention can also possess a plurality of projections extending away from the body in the thickness direction so as to prevent the membrane from abutting the baffles of the plurality of baffles when the spacer is received in the stacked assembly and also optionally further comprises at least one perforation disposed within and through a respective baffle of the plurality of baffles so as to permit fluid flow through the respective baffle when fluid flows through the stacked assembly in the second direction.

FIG. 6A shows a perspective view of another spacer 604. The spacer 604 is an example of the spacer 104 of FIG. 1C. In the illustrated embodiment, the spacer 604 includes baffles 620, joints 622, a body 624, and openings 625. The baffles 620 shown in FIG. 6A include a helical shape. The helical shape extends along any suitable portion of a respective baffle 620. For example, the helical shape extends along an entirety of the respective baffle 620, but the helical shape can extend along an entire span between a pair of joints 622 with which the respective baffle 620 is interconnected.

The baffles 620 are interconnected together, such as at joints 622. The body 624 is formed at least in part by the baffles 620 and includes the joints 622. The body 624 can have a thickness direction T oriented in the first direction Z (FIG. 1C) when the spacer 604 is received in a stacked assembly like 130 (FIG. 1C).

The openings 625 extend through the body 624 in the thickness direction T. Boundaries of the openings 625 are formed at least in part by the baffles 620. The openings 625 in FIG. 6A are shown with a square-shape, but could be configured any shapes, such as rhombus-shape, diamond-shape, polygon-shape, and rounded shapes (e.g., circles or ovals). The openings 625 permit fluid flow there through in the thickness direction T, such as when fluid flow F (FIG. 1C) travels through a stacked assembly 130 in the second direction Y.

The joints 622 correspond to the joints J of FIG. 1C. For example, one or more of the joints 622 are larger in the thickness direction T than at least one of the baffles 620, which provides space between the membrane 102 (FIG. 1C) and the baffles 620 through which fluid can flow to pass over the baffles 620 and through the apertures, or openings, 625. Such arrangements prevent significant portions of the spacer 604 from contacting the surface of the membrane 102, thus reducing a risk of damage to the membrane 102. This feature also reduces the corresponding surface area of the spacer 604 and/or the membrane, which reduces hydrodynamics drag.

FIG. 6B shows the spacer of FIG. 6A with perorations in the baffles 620 and joints 622. As seen in FIG. 6B, passages 626 are arranged through a cross-section of body 624 of the spacer 604. Each of the passages 626A shown in FIG. 6B are disposed within and through a respective baffle 620. This baffle passage arrangement permits fluid flow through the respective baffle 620 when fluid flow F travels through the stacked assembly 130 as in the second direction Y. Passages 626B, shown in FIG. 6B, are also disposed within and through a respective joint 622. This joint passage arrangement permits fluid flow through the respective joint 622 when fluid flow F (FIG. 1C) travels through a stacked assembly 130, such as in the second direction Y.

Optional passages 626A and 626B can be circular, elliptical, or any other shape, and may vary in shape and size along the passage 626A and 626B and/or in comparison to any other passage 626A and 626B. Any suitable number of passages 626A and 626B can be utilized. The number and/or shapes and/or sizes of passages 626A and 626B may be varied according to a particular application of the present invention.

From a hydrodynamics perspective, the optional passages 626A and 626B act to manipulate the local hydrodynamics in the vicinity of the spacer 604. The entrance of a particular passage 626A and 626B acts as a sink for incoming fluid flow, whereas, the exit of the passage 626A and 626B generate a free jet structure (e.g., leading to higher fluid velocities). Thus, the passages 626A and 626B are designed to facilitate flow stabilization and separation control.

The combination of such features and effects of passages 626A and 626B (especially in the vicinity of what might otherwise form a separation zone) with helical shape baffles 620 reduces and/or eliminates seeding of biofilms. Furthermore, such features and effects additionally or alternatively result in the reduction in total hydrodynamic drag (e.g., yielding less restriction in the feed channel and/or the volume V of FIG. 1C), which in turn reduces and/or minimizes the overall operation cost of an RO system. Moreover, the amount of unsteadiness and/or turbulence in the system may be augmented due to local free jets at the exit of passages 626A and 626B.

The feed flow (e.g. flow F in FIG. 1C) follows the helical path. This path directs the majority of the feed to the surface of the membrane 102 and sweep sections of the spacer 604 in a manner that reduces and/or minimizes separation zones that might otherwise facilitate biofilm seeding. Furthermore, the helical shape additionally or alternatively produces higher vorticity in the system, e.g., enhancing unsteadiness and/or turbulence in the feed channel (such as in the volume V of FIG. 1C).

The spacer 604 according to the disclosed embodiments may be made of any material that can reliably separate the semi-permeable membranes without damaging the membranes or interfering with the osmotic filtration processes. Preferably, the present invention spacers are constructed of a polymer-based material having the strength and flexibility needed to maintain the structure of the disclosed spacers, with polypropylene optionally preferred for many applications.

The present invention spacers 604 disclosed herein can vary in size (thickness and aperture size, and optionally, strand size) depending on the specific filtration application. Feed spacer thickness can range from 25 μm to 3000 μm, inclusive, and more preferably have a thickness from 700 μm to 1200 μm, inclusive. Apertures, or openings, in the feed spacer optionally range in size from 0.5 mm×0.5 mm to 5.0 mm×5.0 mm, inclusive, and more preferably the apertures are 1.0 mm×1.00 mm to 3.0 mm×3.0 mm. Aperture sizes are described in terms of a square-shape, however the apertures can be any of a variety of shapes including, but not limited to, rectangular-shape, rhombus-shape, diamond-shape, polygon-shape, and rounded shapes (e.g., circles or ovals). Strand sizes optionally range from 5 strands/inch to 20 strands/inch, inclusive.

The spacer of the present invention is configured for use in stacked assembly in which the membrane comprises a first membrane and the surface optionally comprises a surface of a second membrane and has at least one of the apertures of the plurality of apertures has boundaries forming a diamond-shape, a rhombus-shape, or a square-shape, and the baffles of the plurality of baffles may be formed with at least a portion thereof having a helical shape. In this system, the present invention is a spacer configured to be received in a stacked assembly between a membrane and a surface so that the surface, spacer, and membrane are stacked in a first direction, the spacer being configured to be received in the stacked assembly so as to provide a volume for fluid flow between the membrane and the surface in a second direction transverse to the first direction.

FIG. 7A shows a perspective view of another spacer 704 in the stacked assembly 130 of FIG. 1. In the illustrated embodiment, the spacer 704 includes baffles 720, a body 724, and openings 725 (individually identified as openings 725A and 725B). The body 724 shown in FIG. 7 resembles a plate formed by the baffles 720 interconnected together. The baffles 720 are shown in FIG. 7A defining rounded or circular perimeter boundaries for the openings 725. The baffles 720 define openings 725 of different sizes.

The openings 725 shown in FIG. 7 are grouped into a first subset of openings 725A and a second subset of openings 725B. The openings in the first subset 725A are shown larger than the openings in the second subset 725B. Each opening in the second subset 725B is adjacent on all sides to openings in the first subset 725A, e.g., with the effect that each opening in the second subset 725B is surrounded by openings in the first subset 725A. This arrangement of openings 725 gives an appearance of a honeycomb structures with rounded- or circular-shaped cells, with smaller holes dispersed between the bigger holes (e.g., increasing voids between the cells). Although depicted as circular in FIG. 7A, the openings 725 can be circular, elliptical or any other shape, e.g., according to particular applications.

The spacer 704 functions to reduce and/or minimize drag in the feed channel (e.g., in the volume V of FIG. 1C). Additionally, such an arrangement allows larger exposure of a surface of the membrane 102 to the feed water. In various embodiments, the spacer 704 is provided without (or with a minimal number) of sharp corners of openings 725 or other cells in the spacer 704, which may fundamentally avoid and/or minimize separation zones that might otherwise foster biofouling.

In various embodiments, seaters, projections, or other protrusions 730 are provided in the spacer 704. The protrusion 730 performs at least some of the same functions as the joints J or other structure in FIG. 1C. The protrusions 730 in the illustrated embodiment of FIG. 7 are shown extending away from the body 724 in the thickness direction.

The placement and configuration of the protrusion 730 prevents the membrane 102 (FIG. 1C) from abutting the baffles 720 and/or other portions of the body 724 when the spacer 704 is received in the stacked assembly 130. This configuration reduces the risk of flow blockage through the feed channel. While the projections 730 are seen on the top side of spacer 704 in FIG. 7A, it is also envisioned that the same projections 730 may be disposed in a similar manner on the underside of the spacer 704 to prevents the membrane 102 (FIG. 1C) from abutting the baffles 720 and/or other portions of the body 724 when the spacer 704 is received in the stacked assembly 130.

Other variations also include aspects of multiple embodiments described herein. FIG. 7B shows the spacer of FIG. 7A with optional perforations. In one illustrative example, one or more baffles 720 and/or protrusion 730 of the spacer 704 may include respective passages 726A or 726B, as shown in FIG. 7B, similar to those described in FIG. 5. The baffles 504 and/or 704 may include portions with helical shapes such as occurring with the baffles 604 of FIG. 6A. Spacers may also include different arrangements of baffles than in the illustrated examples, such as including different numbers of baffles per unit length, different thicknesses, and/or different relative angles among baffles and/or joints.

The embodiments described herein reduce membrane fouling (e.g., biofouling), enhance the rate and volume of water purification, and reduce the need for system maintenance. Such results may be due at least in part to various embodiments being capable of minimizing biofouling and drag while maximizing the unsteadiness/turbulence and feed directivity toward the membrane outlet (e.g., the outlet providing reject fluid such as from the higher concentration side). In comparison to other options, the present invention significantly reduces a dominant challenge of membrane processes (e.g., membrane fouling), enhances water productivity, diminishes the need for frequent membrane cleaning using costly and/or environmentally-unfriendly chemicals, which reduces costs (e.g., of operation and/or maintenance) and increases efficiency of the system.

Various embodiments have been individually assessed to confirm functionality thereof. In one example, preliminary modeling and simulations processes were conducted in a supercomputing facility. CAD models of various spacer embodiments were successfully generated. Direct numerical simulations (DNS) of the 3D Navier-Stokes equation were carried out to model an evolving flow field. The simulations were carried out under varying operating parameters corresponding to actual operation ranges of existing RO systems.

An advanced "cut-cell" meshing algorithm was used to discretize and mesh the various models. One advantage of this algorithm is that it generated maximum control volumes that are structured (e.g., rectangular or square). A structured grid of 10 million control volume was generated and the simulation scaling was done using the available computational facility on a supercomputing platform. The large data set was analysed based on operational objectives, and the various simulated embodiments were found to perform as per the objectives.

One set of visualization results is shown in FIGS. 8A-8D. FIGS. 8A and 8B, respectively, shows a hydrodynamics comparison of flow quantities with the conventional spacer 204 of FIGS. 2-4 relative to the disclosed spacer 604 of FIG. 6 having helical baffles 620. As may be appreciated with respect to the visualizations in FIGS. 8A and 8B, the visualization for the helical spacer 604 in FIG. 8B shows a significant reduction in separated zones 812B and an increased vorticity 810B in the computational domain compared to the separated zones 812A and vorticity 810A for the conventional prior art spacer 204 in FIG. 8A.

Similarly, the helical spacer 604 in FIG. 8D shows a significantly lower incidence rate of biofouling 814D in the separation zones or stagnation zones in the computational domain compared to the biofouling 814C in FIG. 8C for the separation zones or stagnation zones in the conventional prior art spacer 204. The helical spacer 604 in FIGS. 8B and 8D minimizes separation zones that might otherwise facilitate biofilm seeding, and additionally or alternatively, produces higher vorticity in the system. The present invention spacers 604 enhances unsteadiness and/or turbulence in the feed channel and thereby reducing fouling 814D with the helical spacer 604 of FIG. 8D as compared to the fouling 814C with the conventional spacer 204 shown in FIG. 8C.

Feed spacers for filtration may be made of any material that can reliably separate the semi-permeable membranes without damaging the membranes or interfering with the osmotic filtration processes. Polymer-based materials have the strength and flexibility needed to maintain the structure of the disclosed spacers. Polymers that may optionally be used for the disclosed feed spacer embodiments, include, but are not limited to low-density polyethylene (LDPE), high-density polyethylene (HDPE), polypropylene, polyvinyl chloride, polystyrene, nylon and thermoplastic polyurethanes, and blends thereof.

Polymers (Greek poly, "many"; -mer, "parts") are large molecules composed of many repeated subunits. Because of their broad range of properties, both synthetic and natural polymers play an essential and ubiquitous role in everyday life. Polymers range from familiar synthetic plastics such as polystyrene and polypropylene to natural biopolymers such as DNA and proteins, which are fundamental to biological structure and function.

Polymers, both natural and synthetic, are created via polymerization of many small molecules, known as monomers. Their consequently large molecular mass relative to small molecule compounds produces unique physical properties, including toughness, viscoelasticity, and a tendency to form glasses or semi-crystalline structures rather than crystals. The units composing polymers derive, actually or conceptually, from molecules of low relative molecular mass. Preferably, the present invention spacers are constructed of a polymer-based material having the strength and flexibility needed to maintain the structure of the disclosed spacers, with polypropylene optionally preferred for many applications.

The present invention spacers disclosed herein can vary in size (thickness and aperture size, and optionally, strand size) depending on the specific filtration application. Feed spacer thickness can range from 25 µm to 3000 µm, inclusive, and more preferably have a thickness from 700 µm to 1200 µm, inclusive. Apertures, or openings, in the feed spacer optionally range in size from 0.5 mm×0.5 mm to 5.0 mm×5.0 mm, inclusive, and more preferably the apertures are 1.0 mm×1.00 mm to 3.0 mm×3.0 mm. Aperture sizes are described in terms of a square-shape, however the apertures can be any of a variety of shapes including, but not limited to, rectangular-shape, rhombus-shape, diamond-shape, polygon-shape, and rounded shapes (e.g., circles or ovals). Strand sizes optionally range from 5 strands/inch to 20 strands/inch, inclusive.

The spacer of the present invention is configured for use in stacked assembly in which the membrane comprises a first membrane and the surface optionally comprises a surface of a second membrane and has at least one of the apertures of the plurality of apertures has boundaries forming a diamond-shape, a rhombus-shape, or a square-shape, and the baffles of the plurality of baffles may be formed with at least a portion thereof having a helical shape. In this system, the present invention is a spacer configured to be received in a stacked assembly between a membrane and a surface so that the surface, spacer, and membrane are stacked in a first direction, the spacer being configured to be received in the stacked assembly so as to provide a volume for fluid flow between the membrane and the surface in a second direction transverse to the first direction.

Any suitable construction process may be used to create spacers described herein. In some embodiments, spacers may be fabricated using 3D printing technology, e.g., based on advance modeling, simulation results, and/or embodiment optimizations. However, any other suitable construction process may also be utilized, including, e.g., injection molding, extrusion, weaving, casting, milling, water-jet cutting, or other additive and/or subtractive processes.

Changes and modifications, additions and deletions may be made to the structures and methods recited above and shown in the drawings without departing from the scope or spirit of the disclosure or the following claims. Thus, components of one exemplary apparatus or method can be combined or excluded to form other apparatuses or methods not specifically shown.

What is claimed is:

1. A spacer configured to be received in a stacked assembly between a membrane and a surface so that the surface, spacer, and membrane are stacked in a first direction, the spacer configured to be received in the stacked assembly so as to provide a volume for fluid flow between the membrane and the surface in a second direction transverse to the first direction, the spacer comprising:
  a plurality of baffles interconnected together by a plurality of joints;
  a body formed at least in part by the plurality of baffles and the plurality of joints, the body having a thickness direction oriented in the first direction when the spacer is received in the stacked assembly;

a plurality of apertures extending through the body in the thickness direction and permitting fluid flow there through when fluid flows through the stacked assembly in the second direction, the apertures having boundaries defined at least in part by the plurality of baffles; and the plurality of joints interconnecting at least some of the baffles of the plurality of baffles so that the plurality of joints and the at least some of the baffles extend in a same plane, wherein one or more perforations extend, along the second direction, throughout one or more joints of the plurality of joints and permit fluid flow through the one or more perforations when fluid flows through the stacked assembly in the second direction.

2. The spacer of claim 1, wherein the spacer is configured for use in stacked assembly in which the membrane comprises a first membrane and the surface comprises a surface of a second membrane.

3. The spacer of claim 1, wherein at least one of the apertures of the plurality of apertures has boundaries forming a diamond-shape, a rhom bus-shape, or a square-shape.

4. The spacer of claim 1, wherein at least one of the joints of the plurality of joints is larger in the thickness direction than at least one of the baffles of the plurality of baffles.

5. The spacer of claim 4, wherein one or more of the baffles of the plurality of baffles further comprises one or more perforation there through that permits fluid flow there through when fluid flows through the stacked assembly in the second direction.

6. The spacer of claim 1, wherein at least one of the baffles of the plurality of baffles is formed with at least a portion thereof having a helical shape.

7. A spacer configured to be received in a stacked assembly between a membrane and a surface so that the surface, spacer, and membrane are stacked in a first direction, the spacer configured to be received in the stacked assembly so as to provide a volume for fluid flow between the membrane and the surface in a second direction transverse to the first direction, the spacer comprising:

a plurality of baffles interconnected together by a plurality of joints, one or more of the baffles of the plurality of baffles formed with at least a portion thereof having a helical shape;

a body formed at least in part by the plurality of baffles and the plurality of joints, the body having a thickness direction oriented in the first direction when the spacer is received in the stacked assembly;

a plurality of apertures extending through the body in the thickness direction and permitting fluid flow there through when fluid flows through the stacked assembly in the second direction, the apertures having boundaries defined at least in part by the plurality of baffles; and the plurality of joints interconnecting at least some of the baffles of the plurality of baffles so that the plurality of joints and the at least some of the baffles extend in a same plane, wherein one or more perforations extend, along the second direction, throughout one or more joints of the plurality of joints permitting a fluid flow through the respective one or more joints when fluid flows through the stacked assembly in the second direction.

8. The spacer of claim 7, wherein the spacer is configured for use in stacked assembly in which the membrane comprises a first membrane and the surface comprises a surface of a second membrane.

9. The spacer of claim 7, further comprising one or more perforation disposed within and through one or more baffle of the plurality of baffles so as to permit fluid flow through the respective baffle when fluid flows through the stacked assembly in the second direction.

10. The spacer of claim 7, wherein at least one of the joints of the plurality of joints is larger in the thickness direction than at least one of the baffles of the plurality of baffles.

11. The spacer of claim 10, wherein at least one of the joints of the plurality of joints that is larger in thickness direction further comprises a perforation there through that permits fluid flow there through when fluid flows through the stacked assembly in the second direction.

12. The spacer of claim 7, wherein at least one of the apertures of the plurality of apertures has boundaries forming a square-shape, a diamond-shape, a rhombus-shape, or a circular shape.

13. The spacer of claim 10, wherein one or more of the baffles of the plurality of baffles has a helical shape extending an entire span between a pair of the joints of the plurality of joints.

* * * * *